United States Patent
Kim

(10) Patent No.: US 9,641,344 B1
(45) Date of Patent: May 2, 2017

(54) MULTIPLE FACTOR AUTHENTICATION IN AN IDENTITY CERTIFICATE SERVICE

(71) Applicant: MOBILE IRON, INC., Mountain View, CA (US)

(72) Inventor: Mansu Kim, Cupertino, CA (US)

(73) Assignee: MOBILE IRON, INC., Mountain View, CA (US)

( * ) Notice: Subject to any disclaimer, the term of this patent is extended or adjusted under 35 U.S.C. 154(b) by 60 days.

(21) Appl. No.: 14/493,237

(22) Filed: Sep. 22, 2014

Related U.S. Application Data

(60) Provisional application No. 61/880,687, filed on Sep. 20, 2013.

(51) Int. Cl.
*H04L 29/06* (2006.01)
*H04L 9/32* (2006.01)

(52) U.S. Cl.
CPC ............ *H04L 9/3268* (2013.01); *H04L 9/321* (2013.01); *H04L 63/0823* (2013.01)

(58) Field of Classification Search
CPC .................................. G06F 21/31; G06F 21/33
USPC .......................................................... 713/156
See application file for complete search history.

(56) References Cited

U.S. PATENT DOCUMENTS

| | | |
|---|---|---|
| 8,117,344 B2 | 2/2012 | Mendez et al. |
| 8,713,646 B2 | 4/2014 | Stuntebeck |
| 2005/0108551 A1* | 5/2005 | Toomey ................. G06F 21/31 713/185 |
| 2008/0046735 A1* | 2/2008 | Nedeltchev ......... H04L 63/0823 713/173 |
| 2012/0102548 A1* | 4/2012 | Tamura ................... G06F 21/31 726/4 |

\* cited by examiner

*Primary Examiner* — Syed Zaidi
(74) *Attorney, Agent, or Firm* — Van Pelt, Yi & James LLP

(57) ABSTRACT

Multiple factor authentication in an identity certificate service is disclosed. A certificate including a cryptographically-obscured identifier associated with the end entity is sent from an end entity to a service node. The service node uses both the certificate and the identifier to authenticate the end entity at least in part by comparing the identifier to a reference identifier. A service associated with the service node is accessed based at least in part on the authentication.

21 Claims, 12 Drawing Sheets

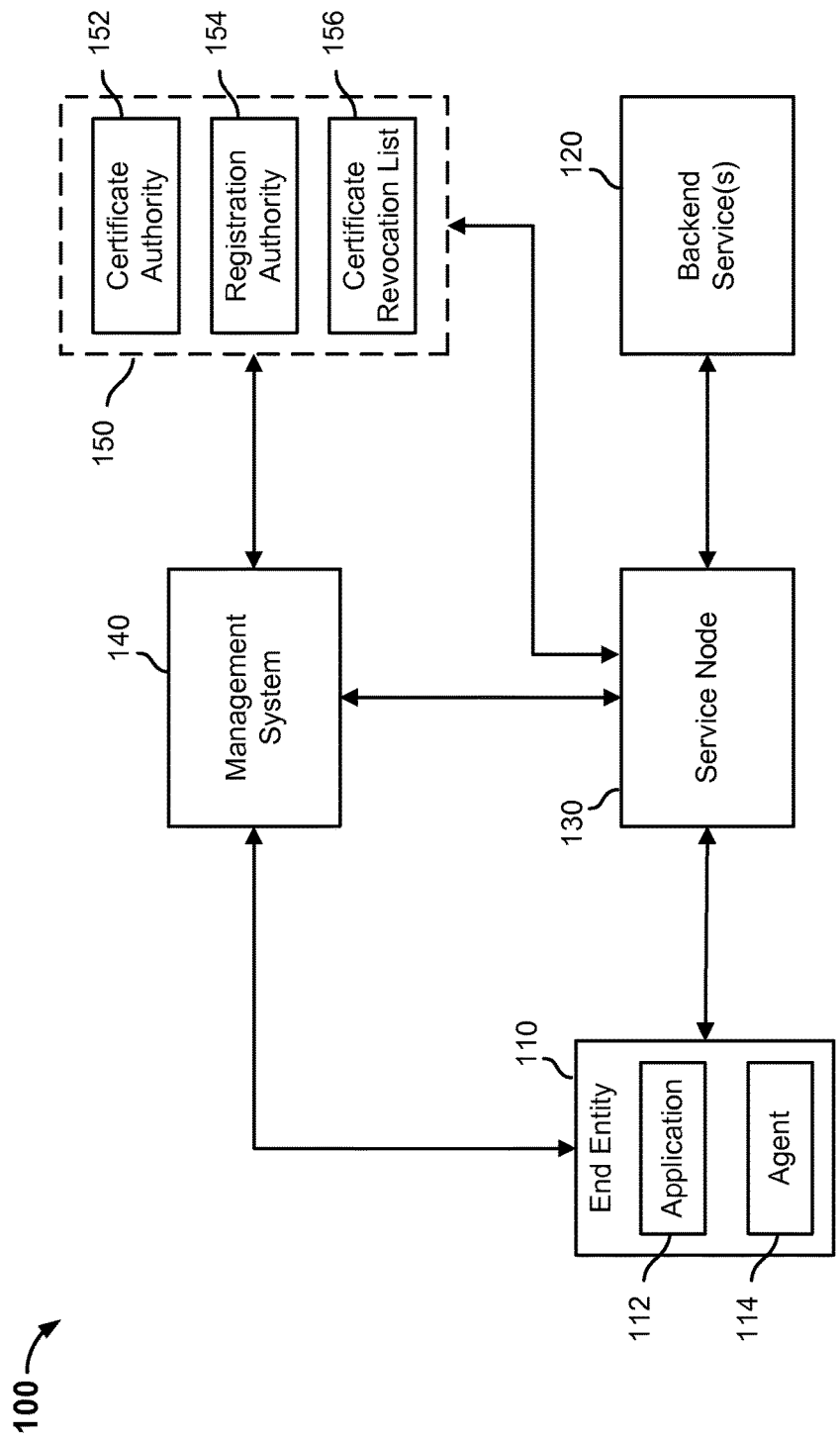

900

Name: XYZCo-ALL-SCEP-Exchange

Description: Certificates for authentication on Service_X

Enable Proxy: ✓

☑ Cache Locally Generated Keys

● User Certificate   ○ Device Certificate

Setting Type: Local

Local CAs: XYZCo-ALL-Corp-Exchange

Subject: Svc1id:hmacsha1(svc1key,$USER_EMAIL$), O=Company123

Subject Common Name Type: None

Subject Alternative Name Type: RFC 822 Name

Subject Alternative Name Value: svc1id:hmacsha1(svc1key, "$USER_UPNS$:$DEVICE_SERIAL_NUMBERS$")

Key Size: 2048

Key Usage: ☑ Signing  ☑ Encryption

FIG. 9

MULTIPLE FACTOR AUTHENTICATION IN AN IDENTITY CERTIFICATE SERVICE

CROSS REFERENCE TO OTHER APPLICATIONS

This application claims priority to U.S. Provisional Patent Application No. 61/880,687 entitled SECOND FACTOR FOR PKI IDENTITY CERTIFICATE SERVICE filed Sep. 20, 2013, which is incorporated herein by reference for all purposes.

BACKGROUND OF THE INVENTION

Identity certificates are commonly used to verify the identity of an end entity. For example, a service may use a certificate to verify the identity of end entity such as a mobile device, application, laptop, computing device, and/or other entity. A certificate may be used to generate an authenticated and secure communication channel between an end entity and a service via a service node without the use of shared keys or user ID/password entry.

In some cases, identity certificates may be vulnerable to tampering. Identity certificates are typically stored in a keychain and/or other repository associated with the operating system and/or application of a device. In certain cases, the keychain and/or other repository storing the certificate may be easily accessed. For example, a mobile device may be compromised, and the keychain exported to another unauthorized device. This could, in some cases, result in unauthorized access to protected resources.

BRIEF DESCRIPTION OF THE DRAWINGS

Various embodiments of the invention are disclosed in the following detailed description and the accompanying drawings.

FIG. 1A is a block diagram illustrating embodiments of multiple factor authentication in an identity certificate service.

FIG. 9 is a diagram illustrating embodiments of an interface to generate a certificate.

DETAILED DESCRIPTION

Figure 1B:
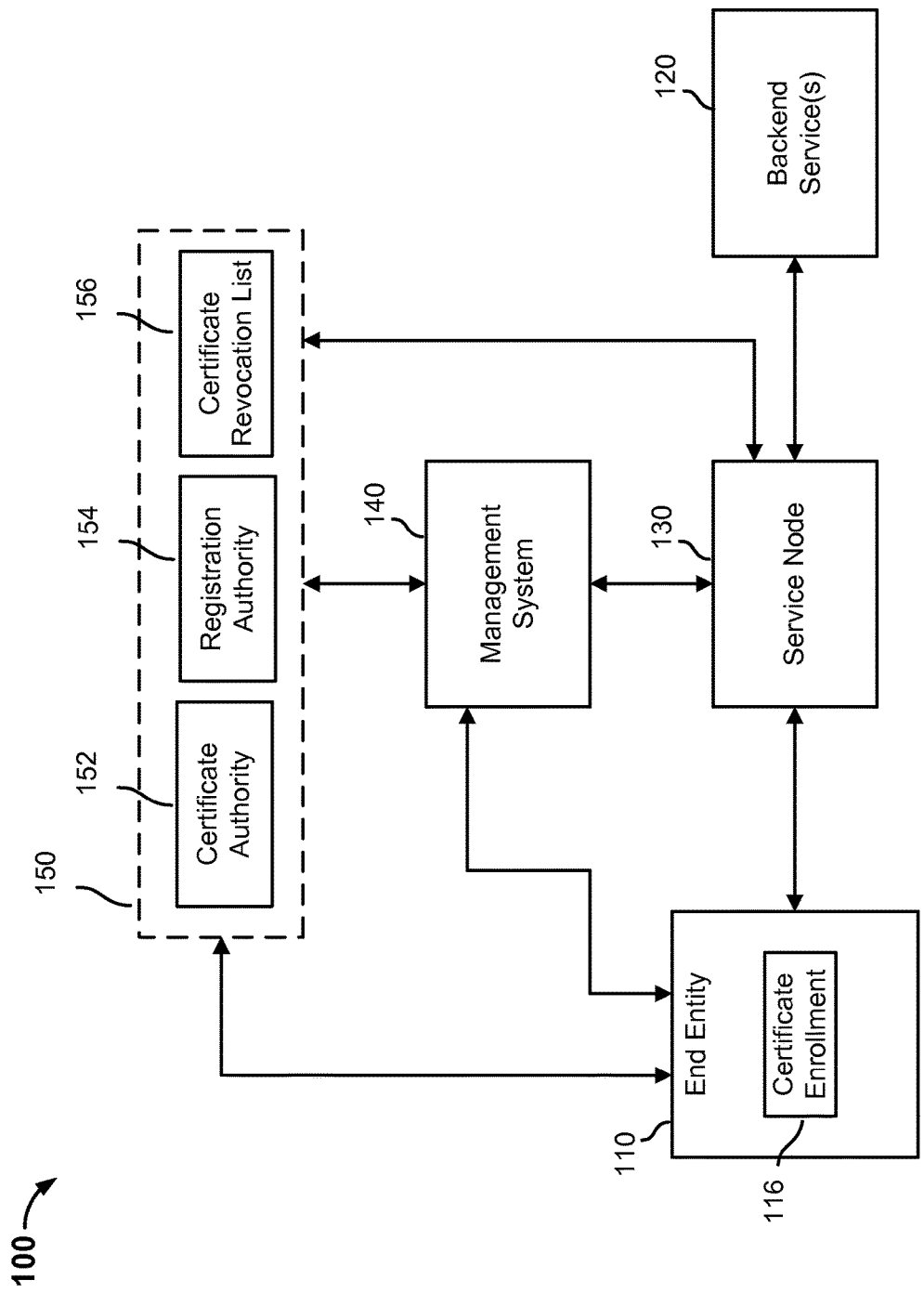
FIG. 1B is a block diagram illustrating embodiments of multiple factor authentication in an identity certificate service.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Multiple factor authentication in an identity certificate service is disclosed. In various embodiments, multiple factors are used to validate and/or authenticate the identity of a device, application, and/or other end entity attempting to connect to a service. Multiple factor authentication may include validation of an identity certificate, validation of an identifier included in the certificate, and/or validation of other information. In some cases, multiple factor authentication may be used to detect unauthorized certificate export, such as malicious extraction of a certificate from one mobile device and installation on another mobile device.

In some embodiments, a certificate including a cryptographically-obscured identifier associated with an end entity is sent from the end entity to a service node. The service node uses both the certificate and the identifier to authenticate the end entity at least in part by comparing the identifier to a reference identifier. Access is provided to a service associated with the service node based at least in part on the authentication.

FIG. 1A is a block diagram illustrating embodiments of multiple factor authentication in an identity certificate service. In the example shown, system 100 includes components of an identity certificate service, such as a public key infrastructure (PKI) service. In some embodiments, an end entity 110 establishes a secure authenticated connection to backend services 120 via a service node 130 using a certificate generated using the techniques disclosed herein. The end entity 110 may include, for example, a mobile device, laptop computer, desktop computer, and/or other computing device. An end entity 110 may also include an application, program, and/or software running on a computing device.

The service node 130 may include, for example, a proxy server, reverse proxy server, a gateway server, an access point, Wi-Fi access point, virtual private network (VPN) server, and/or any other type of server. The service node 130 controls access to the backend services by verifying the identity of the end entity 110 and establishing a secure communication session and/or tunnel between the end entity 110 and the backend service 120. The backend services 120 may include, for example, email services (e.g., Microsoft Exchange™), enterprise content management services (e.g., Microsoft Sharepoint™), a virtual private network (VPN), a Wi-Fi network, enterprise servers, enterprise network resources, and/or other resources.

In various embodiments, an end entity 110 provides a certificate to the service node 130 to gain access to backend services 120. The certificate may include any suitable digital certificate for determining whether the end entity 110 is authorized to access the backend resources 130. The certificate may include an identity certificate used in a public key infrastructure (PKI). In one example, a certificate includes an X.509 certificate. In various embodiments, the certificate includes identifier(s) associated with the end entity 110. The identifier(s) associated with the end entity may be specific to the end entity. For example, the identifier(s) may only be associated with the end entity. An identifier associated with the end entity may include, for example, a machine access control (MAC) address associated with a device (e.g., Wi-Fi MAC address), an application universally unique identifier (UUID), a device international mobile station equipment identity (IMEI), a device identification parameter (e.g., a Microsoft Exchange ActiveSync™ device ID parameter), a device serial number, a user identifier (user ID), a unique identifier associated with a communication interface of a device, and/or any other type of identifier.

In some embodiments, the certificate, identifiers included in the certificate, and/or portions of the certificate are cryptographically obscured. In certain cases, the certificate, portions of the certificate, and/or information in the certificate may be encrypted. In one example, a public key associated with the service node 130 is used to encrypt the certificate, portions of the certificate, and/or information in the certificate. In another example, a shared secret between the service node 130 and the device management system 140 is used to encrypt and/or otherwise cryptographically obscure the certificate, portions of the certificate, and/or information in the certificate. In some cases, the certificate, portions of the certificate, and/or information in the certificate are hashed. Other approaches may be used to obscure, obfuscate, and/or render the certificate and/or portions thereof secure.

In various embodiments, identifier(s) associated with the end entity included in the certificate are cryptographically-obscured. In one example, identifiers associated with the end entity are included in the Subject, Subject Alternative Name, and/or other fields of a certificate, and these fields may be cryptographically-obscured. For example, the identifiers may be encrypted using a public key associated with the service node, encrypted using a shared secret between the device management platform and service node, hashed using a hash function and/or mechanism, and/or otherwise obscured.

In some embodiments, device identifiable information, application identifiable information, personally identifiable information (PII), and/or other potentially sensitive information included in the certificate are cryptographically obscured. Any information included in a certificate that could be used to determine the identity of a user associated with the end entity 110 may be cryptographically obscured. For example, the Subject, Subject Alternative Name, and/or other fields in certificate may include a subject distinguishing name, subject alternative name, user identifiers (user ID), and/or other potentially sensitive information. In certain cases, this information may be encrypted using, for example, a public key associated with the service node, hashed (e.g., one-way hashed), and/or otherwise obscured so that an unintended third party, such as a malicious third party, would not be able to determine the identity of a user associated with the end entity 110 upon gaining access to the certificate.

In the example shown, a management system 140 obtains a certificate on behalf of the end entity 110. In this case, the end entity 110 may not include a certificate enrollment engine and/or other features enabling it to communicate with a certificate authority 152. The management system 140 negotiates with a certificate-related entity 150 to obtain a certificate for the end entity 110. A certificate-related entity 150 may include a certificate authority (CA) 152, registration authority (RA) 154, and/or other entity.

In some embodiments, a certificate authority 152 and/or registration authority 154 are external to the management system 140. For example, any suitable third-party certificate authority 152 and/or registration authority 154 may be used. In various embodiments, the management system 140 includes an onboard certificate authority 152, certificate revocation list (CRL) 156, and/or other certificate-related functionality.

In some embodiments, the management system 140 imitates (or spoofs) an end entity 110 in its negotiations and/or communications with a certificate-related entity 150 (an external certificate authority 150 and/or registration authority 152). Prior to negotiating with the certificate authority 152, the management system 140 may generate a private-public key pair on behalf of the end entity 110. In one example, the management system 140 generates a private key and public key for a mobile device 110 using a device object stored at the management system 140. In some cases, the end entity 110 may generate the key-pair and provide the key pair to the management system 140.

According to some embodiments, the management system 140 may negotiate with a certificate-related entity 150 using various protocols including, for example, Simple Certificate Enrollment Protocol (SCEP), Certificate Management Protocol (CMP), and/or other protocols. SCEP is a PKI communication protocol which leverages existing technology by using PKCS#7 and PKCS#10 over Hypertext Transfer Protocol (HTTP). For example, the management system 140 may enroll the end entity with a certificate authority 150 by sending certificate signing request (CSR) messages and/or other messages to a certificate authority 150. Using SCEP and/or another protocol, CSR messages may be generated and transmitted according to PKCS#10 and/or PKCS#7 protocols. The CSR messages may include, for example, the public key of the end entity, a distinguished name associated with the end entity, a subject alternative name associated with the end entity, a set of attributes providing other information about the entity, and/or other information. The end entity distinguished name may include a common name, organization, organizational unit, locality, state or province, country/region, and/or other information. The subject alternative name associated with the entity may include an identifier associated with the end entity, such as a MAC address (Wi-Fi MAC address), IMEI of a mobile device, an application UUID, and/or other identifier.

In various embodiments, the distinguished name associated with the end entity, subject alternative name, and/or fields included in the certificate request are cryptographically obscured. In one example, the management system 140 encrypts the subject distinguished name, subject alternative name, device/application/user identifiable information, and/or other information using a public key associated with the service node 130. In another example, the subject distinguished name, subject alternative name, device/application/user identifiable information, and/or other information is hashed using, for example, a hash function stored at and/or known to the management system 140 and/or service node 130. The hash function may include, for example, a keyed hash algorithm, such as key-hash message authentication code using SHA-1 (HMAC-SHA-1).

In some embodiments, the certificate request is sent to a certificate authority 152 and/or registration authority 154. In certain cases, the negotiation between the management system 140 and certificate authority 152 and/or registration authority 154 may occur through a web or hypertext markup language-(HTML) and/or HTTP-based interface. In some cases, the certificate authority 152 and/or registration authority 154 replies with requests for additional information. Negotiation with the certificate authority 152 and/or registration authority 154 may end when the certificate authority 152 and/or registration authority 154 issues a certificate for the end entity 110 to the management system 140.

According to some embodiments, a certificate authority 152 is included in the management system 140. In this case, the certificate negotiation process may be abbreviated, and the onboard certificate authority 152 may generate the certificate as specified by the management system 140.

In various embodiments, the subject distinguished name information, identifiers associated with the end entity, device-identifiable information, application-identifiable information, user-identifiable information, personally-identifiable information (PII), and/or other information included in the certificate may be cryptographically obscured (e.g., encrypted, hashed, obscured, etc.). In one example, an identifier associated with the end entity is included in the subject alternate name field of a certificate, and the subject alternative name (SAN) field is cryptographically obscured. The information may be cryptographically obscured in such a way that the end entity will not be able to decipher (read) the information. As a result, if the end entity 110 is compromised, the information will not be retrievable. In one example, an end entity 110 may include a mobile device, and in the event the mobile device is jailbroken, rooted, stolen, and/or compromised, a malicious party will not have access to the cryptographically-obscured information included in the certificate.

In various embodiments, the device management system 140 may cache the certificate, end entity private and public keys, and/or other information before transmission to the end entity 110.

In some embodiments, the certificate, end entity private and public keys, and/or other information are provided from the management system 140 to the end entity 110. In one example, the certificate may be pushed from the management system 140 to an end entity 110 including a mobile device. Upon receipt of the certificate, a management agent 114 and/or control client may install the certificate. In one example, the management agent 114 provides the certificate to an application 112 associated with the certificate, and the application 112 stores the certificate in, for example, storage accessible to the application 112. In another example, the management agent 114 stores the certificate for the application 112, and the application 112 retrieves the certificate from the management agent 114 as needed.

According to various embodiments, the management system 140 generates end entity configuration parameters/information. The configuration parameters/information may include, for example, an application identifier (e.g., Exchange ActiveSync client ID), user identifier, device identifier (e.g., MAC address), and/or other information. The configuration parameters are sent to the end entity 110 in a communication separate from the certificate transmission. In some embodiments, the configuration information is provided to an application 112 on a mobile device (an end entity) via an operating system-related communication (e.g., an operating system configuration update). In various embodiments, the configuration information is provided to a device management agent 114 at the end entity 110. The management agent 114 provides the configuration information to the application 112. In various embodiments, the configuration information includes information used to establish a connection with the service node 130 and/or backend services 120. The configuration information may include parameters used in communications protocol messages sent from the end entity 110 to the service node 130 and/or backend services 120. By way of example, mobile application configuration information includes an Exchange profile including an Exchange ActiveSync client ID and/or other information. A mobile device and/or application 112 thereof may establish a secure connection tunnel with a service node 130 by sending header information including the Exchange ActiveSync client ID—a type of application configuration information. As discussed below, the application/device identifier (the Exchange ActiveSync client ID) is compared to an application/device identifier included in a certificate to validate the identity of the end entity 110.

According to some embodiments, the end entity 110 connects to the service node 130. The service node 130 may include a proxy, reverse proxy, gateway, and/or intermediate node between the end entity 110 and the backend services 120 to which the end entity 110 seeks to connect. In some cases, the end entity 110 may establish a communication session with the service node 130 using a secure communication protocol, such as secure sockets layer (SSL), transport layer security (TLS), Exchange ActiveSync, Wi-Fi protocol (802.11), and/or other protocol. In certain cases, the configuration information received from the management system 140 is used to establish a communication tunnel with the service node 130. In some cases, the configuration information received from the management system 140 is included in messages sent according to the protocol. For example, application identification information, user identification information, and/or other information may be included in a header of packets sent from the end entity 110 to the service node 130 over the secure communications channel. As discussed below, this configuration information may be compared to information in the certificate to validate the identity of the end entity 110.

In various embodiments, the service node 130 validates the end entity using multiple factor authentication including, for example, certificate validation and validation of identifier(s) included in the certificate. In some cases, the service node 130 requests that the end entity 110 provide a certificate to validate its identity. In response, the end entity 110 provides a certificate to the service node 130. As discussed above, the certificate may include cryptographically-obscured identifier(s) associated with the end entity.

In some embodiments, the service node 130 extracts the cryptographically-obscured end entity identifier(s) from the certificate. In some cases, a cryptographically-obscured identifier includes an encrypted identifier in the Subject Alternative Name field of a certificate. The encrypted identifier may be encrypted at the management system 140 using a public key associated with the service node 130 (as discussed above). In this case, the service node 130 decrypts the identifier using its private key. In a further example, the encrypted identifier may be encrypted at the management system 140 using a shared secret between the management system 140 and the service node 130. In this case, the service node 130 decrypts the identifier using the shared secret. In another example, the cryptographically-obscured end entity identifier includes a hash of an identifier. In this case, the service node 130 extracts the hashed identifier from the certificate.

According to some embodiments, the identifier(s) included in the certificate are compared to reference identifier(s) associated with the same end entity 110. In some embodiments, a reference identifier is included in end entity configuration information. As discussed above, the management system 140 may provide end entity configuration information to the end entity 110 (e.g., an application 112 on a device, a management agent 114 on a device, a device, etc.). And, in some cases, the configuration information may be used to establish a secure communication tunnel between the end entity 110 and the service node 130. In various cases, the configuration information may be included in messages (e.g., header of message(s)) sent from the end entity 110 to the service node 130. Portions of the configuration information may be used as a reference identifier. For example, an application may establish a connection to the service node 130 using an application identifier received from a management system 140. In this case, the application identifier may include the reference identifier. This reference identifier (the application identifier) may be compared to a cryptographically-obscured application identifier extracted from a certificate.

In various embodiments, a reference identifier is retrieved from the management system 140. For example, the service node 130 may receive the certificate from the end entity 110 and extract the end entity identifier from the certificate. The service node 130 may access the device management server 140 to retrieve an identifier that the management system 140 has stored for certificate. In this case, the identifier that the management system 140 has stored for certificate includes the reference identifier. The service node 130 may validate that the end entity identifier extracted from the certificate matches the reference identifier from the device management system 140.

In the event the end entity identifier from the certificate matches the reference identifier, a validation process may proceed. In the event the end entity identifier in the certificate does not match the reference identifier, it may be determined that the end entity (e.g., mobile device, application, etc.) that is attempting to connect to the backend service 120 is not the same as the end entity to which the certificate was issued. In this case, the management system 140, end entity 110, and/or other entities may be notified the failed validation attempt.

According to some embodiments, multiple cryptographically-obscured identifiers included in a certificate may each be compared to separate reference identifiers. In some cases, multiple identifiers may be separately cryptographically-obscured (e.g., encrypted, hashed, etc.) and/or separately included in the certificate. In one example, a certificate may include multiple cryptographically-obscured identifiers including a user identifier (e.g., user principal name (UPN)), a device serial number, and/or other identifiers. The cryptographically-obscured user identifier may be compared to a reference user identifier while the cryptographically-obscured device serial number is compared to a reference device serial number. Any combination of cryptographically-obscured identifiers may be compared to any combination of reference identifiers.

In some embodiments, multiple identifiers may be combined into one cryptographically-obscured identifier. For example, multiple identifiers may be combined using, for example, a hashing function (e.g., HMAC-SHA1, etc.). In this case, the one cryptographically-obscured identifier may be compared to a single reference identifier.

In some embodiments, the service node 130 validates the certificate. In some cases, the service node 130 may access a certificate revocation list 156 associated with the certificate authority 152 and/or registration authority 154 that issued the certificate. A certificate revocation list 156 includes a list of certificates (serial numbers for certificates) that have been revoked. If the certificate provided by the end entity is included in the certificate revocation list 156, the service node 130 may determine that access to the backend services 120 should be blocked. In certain cases, the service node 130 validates the certificate by sending an online certificate status protocol (OCSP) request to a certificate authority 152 and/or registration authority 154 that issued the certificate. In response to the OCSP message, the certificate authority 152 and/or registration authority 154 may confirm that the certificate is valid or inform the service node 130 that the certificate is not valid. In the event the certificate and the identifier in the certificate are determined to be valid, the service node 130 may provide the end entity 110 access to the backend services 120.

Using the techniques disclosed herein multiple factor validation of the end entity 110 is performed. The first factor validated includes the end entity identifier(s) included in the certificate, and the second factor validated includes the certificate itself. Confirming the validity of the identifier(s) in the certificate and the certificate itself reduces the likelihood that a certificate could be successfully used in a device and/or application other than the one identified in the certificate. The multiple factor validation and/or authentication techniques disclosed herein may prevent a malicious user from exporting the certificate from a device and using the exported certificate on another device. The techniques also reduce the likelihood of a jailbroken, rooted, and/or otherwise compromised device accessing backend services.

FIG. 1B is a block diagram illustrating embodiments of multiple factor authentication in an identity certificate service. In the example shown, an end entity 110 obtains a certificate from a certificate-related entity 150, such as a certificate authority 152, registration authority 154, and/or other entity. In various embodiments, the device management system 140 initiates the certificate enrollment process. In some cases, the device management system 140 generates end entity identifier(s). The device management system 140 may cryptographically obscure the end entity identifier(s) so that the identifier(s) are not accessible to the end entity and/or user thereof. The device management system 140 may, for example, encrypt the end entity identifier using a key associated with the service node 130, encrypt the end entity identifier using a shared secret between the service node 130 and device management system 140, generate a hash of the end entity identifier using a hash function, and/or otherwise render the end entity identifier unreadable. In some cases, the device management system 140 generates a hash of the end entity identifier, and stores the hashed end entity identifier in a database at the device management system 140.

In various embodiments, the cryptographically-obscured identifier is provided to the end entity 110. In some cases, the device management system 140 commands a certificate enrollment engine 116 associated with the end entity 110 to initiate certificate enrollment. And the device management system 140 pushes the cryptographically-obscured identifier to the certificate enrollment engine 116 and/or end entity 110 along with the command to initiate certificate enrollment.

In some embodiments, the device management system 140 commands the certificate enrollment engine 116 associated with the end entity 110 to initiate certificate enrollment without generating and/or sending the cryptographically-obscured identifier to the end entity 110. In some cases, the certificate-related entity 150, such as the certificate authority 152 and/or registration authority 154, generates the cryptographically-obscured identifiers, and includes the identifiers in the certificate. In certain cases, the certificate-related entity 150 communicates with the device management system 140 to determine and/or retrieve cryptographically-obscured identifier(s) for inclusion in the certificate.

According to some embodiments, the certificate enrollment engine 116 negotiates with a certificate-related entity 150 using a various protocols including, for example, SCEP, CMP, and/or other protocols. In some embodiments, the certificate enrollment engine 116 sends certificate request messages to a certificate authority 152 and/or registration authority 154. In one example, the certificate enrollment engine 110 sends CSR messages and/or other messages to a certificate authority 150. The CSR messages may include, for example, the public key of the end entity, a distinguished name associated with the end entity, a subject alternative name associated with end entity, a set of attributes providing other information about the entity, and/or other information. In various embodiments, the certificate enrollment engine 116 includes the cryptographically-obscured identifier in the subject alternative name field of the certificate request message. As discussed above, the cryptographically-obscured identifier is generated at the device management system 140 for inclusion in the certificate request. In various embodiments, other information included in the certificate request is cryptographically-obscured. For example, the subject distinguished name, device/application/user identifiable information, and/or other information included in the certificate may be encrypted by the device management system 140.

In various embodiments, the certificate authority 152 and/or registration authority 154 may reply with requests for additional information. In some embodiments, the certificate authority 152 and/or registration authority 154 requests device specific parameters from the device management system 140. In one example, a certificate authority 152 may send a request to the device management system 140 to provide information related to the device, application, user, and/or service. The device management system 140 may reply with requested information. For example, the certificate authority 152 may communicate with the device management system 140 to determine and/or retrieve cryptographically-obscured identifier(s) for inclusion in the certificate.

According to some embodiments, negotiation with the certificate authority 152 and/or registration authority 154 may end when the certificate authority 152 and/or registration authority 154 issues a certificate to the end entity 110.

The issued certificate includes the cryptographically-obscure identifier(s) associated with the end entity. The certificate may be used to authenticate and/or validate the identity of the end entity to the service node 140 and/or backend services 120.

Figure 2:
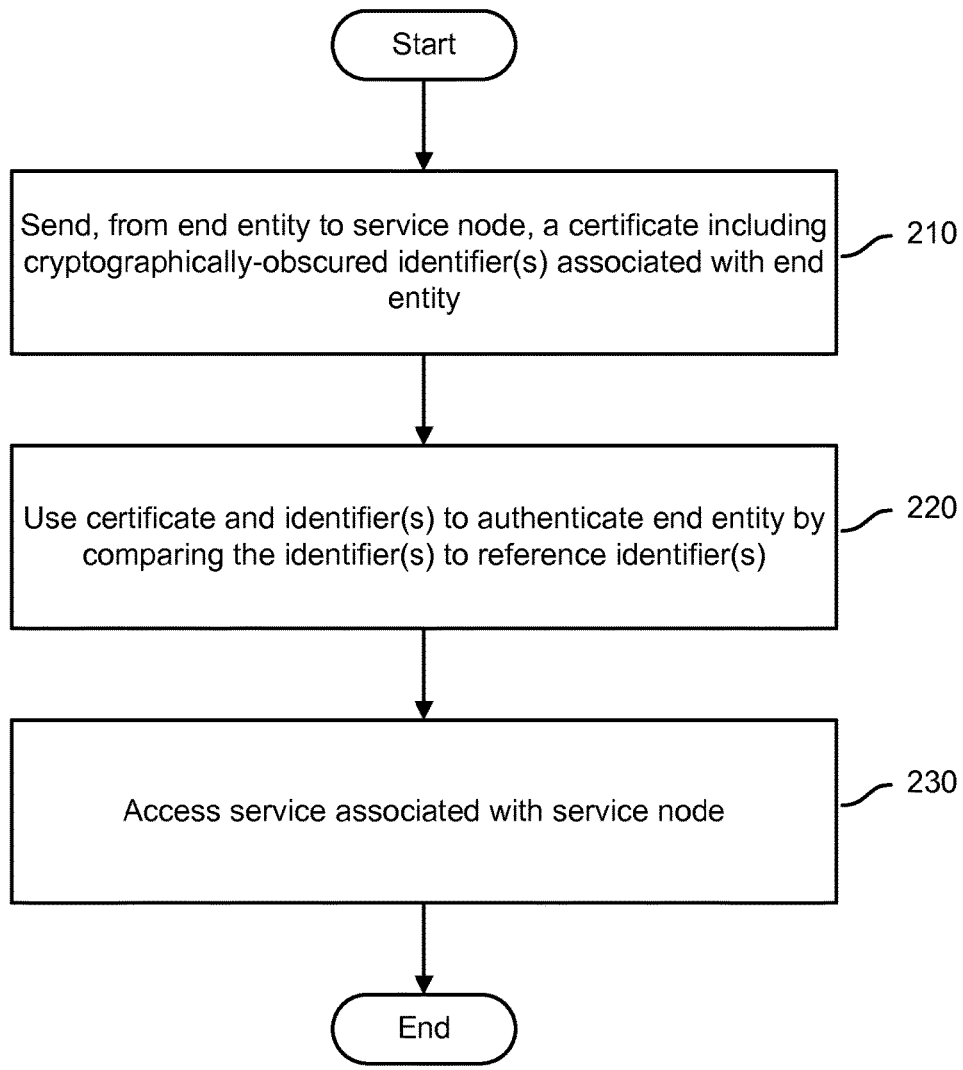
FIG. 2 is flow chart illustrating embodiments of a process of multiple factor verification with an identity certificate service.

FIG. 2 is a flow chart illustrating embodiments of a process of multiple factor verification with an identity certificate service. At 210, a certificate including a cryptographically-obscured identifier(s) associated an end entity is sent from the end entity to a service node. The certificate includes identifier(s) associated with the end entity, and the identifier(s) are cryptographically obscured. In some cases, the end entity includes a mobile device and/or an application on a mobile device. The identifier associated with the end entity may include, for example, a device identifier (e.g., a MAC address of a device, a device IMEI, etc.) an application identifier (e.g., an application UUID), user identifier, and/or any other identifier. In some cases, the identifier is cryptographically-obscured at a device management system. In various embodiments, the management system may encrypt the identifier using a public key associated with the service node, may encrypt the identifier using a shared secret between the service node and the device management system, may hash the identifier, and/or otherwise obscure the identifier.

At 220, the certificate and identifier(s) are used to authenticate the end entity at the service node. The certificate and the identifier(s) included in the certificate are each factors used in a multi-factor authorization process. In various embodiments, the service node extracts the cryptographically-obscured identifier(s) from the certificate. An extracted identifier is compared to a reference identifier. In some cases, a cryptographically-obscured identifier includes an encrypted identifier associated with the end entity. The end entity identifier may be encrypted using a public key associated with the service node, and the service node may use its private key to decrypt the identifier. In various cases, an end entity identifier may be encrypted using a shared secret between the service node and device management system, and the service node may use the shared secret to decrypt the identifier. The decrypted identifier is then compared to a reference identifier. In certain cases, the cryptographically-obscured identifier is hashed using a hash function stored at the device management system and/or service node. The hashed identifier is extracted from the certificate and compared to a reference identifier hashed using the same hash function. The comparison may occur at the service node, device management server, and/or other node.

According to some embodiments, an identifier from the certificate is compared to a reference identifier. In the event the two identifiers do not match, access to a service associated with the service node is denied. In the event the identifier from the certificate matches the reference identifier, the validation/authentication process proceeds.

According to some embodiments, multiple cryptographically-obscured identifiers included in a certificate may each be compared to separate reference identifiers. In the event the cryptographically-obscured identifiers from the certificate do not match the multiple reference identifiers, access to a service associated with the service node is denied. In the event the identifiers from the certificate match the multiple reference identifiers, the validation/authentication process proceeds.

In various embodiments, the certificate is validated. In one example, the service node validates the certificate by accessing a certificate revocation list (CRL) associated with the certificate authority and/or registration authority.

At 230, access is provided to a service associated with the service node. In some embodiments, access is granted based on a determination that both the certificate and the identifier included in the certificate are valid. The service node may provide the end entity access to a service, and the service node may act as a proxy for communications between the end entity and the service.

Figure 3:
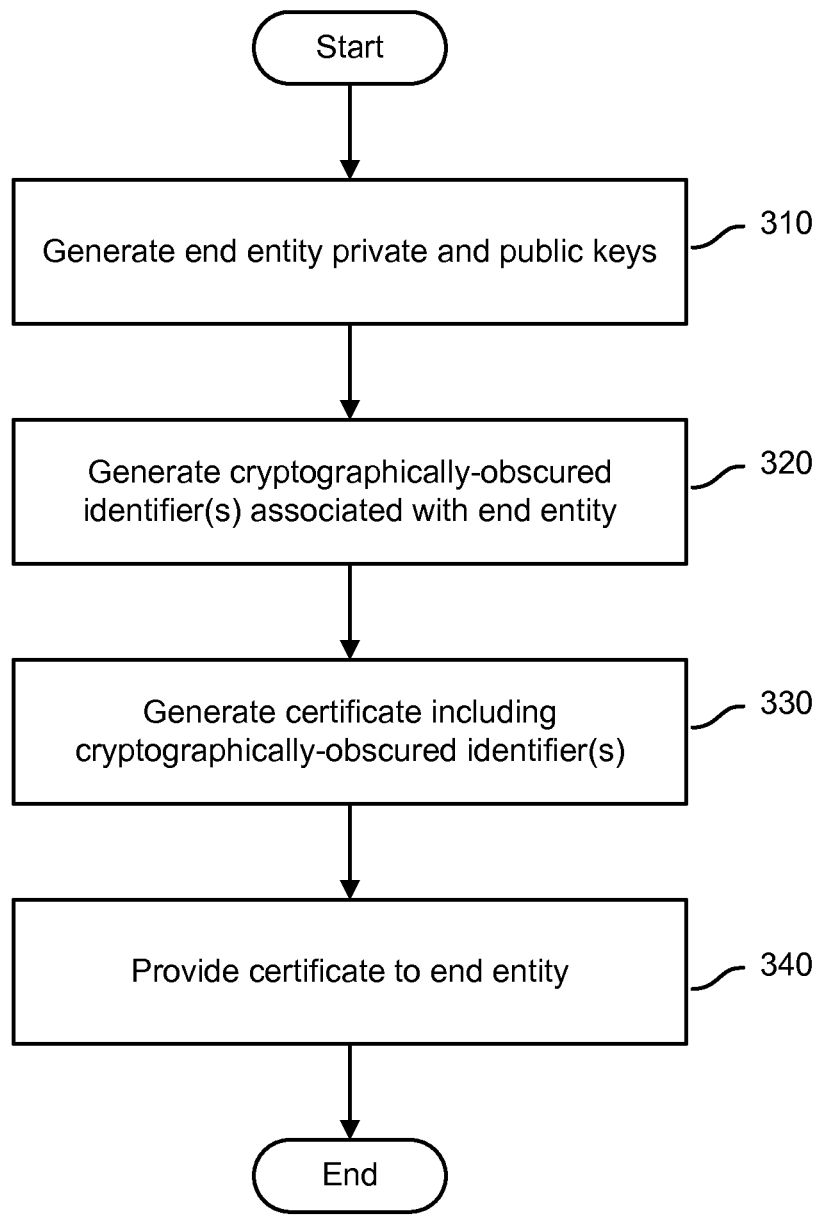
FIG. 3 is a flow chart illustrating embodiments of a process of generating a certificate on behalf of an end entity.

FIG. 3 is a flow chart illustrating embodiments of a process of generating a certificate on behalf of an end entity. In various embodiments, the process 300 is performed at device management system 140 of FIG. 1A. At 310, end entity private and public keys are generated. In some embodiments, a device management system generates a private-public key pair for the end entity. In one example, a device object stored at the management system is used to generate a private-public key pair for a mobile device. In alternative embodiments, an end entity generates the private-public key pair and provides the key pair to the management system.

At 320, cryptographically-obscured identifier(s) are generated. In various embodiments, a cryptographically-obscured identifier includes an encrypted end entity identifier. In one example, the end entity identifier is encrypted using a public key associated with the service node. The service node may provide the service node public and/or private keys to the device management system, and the service node public key may be used to encrypt the end entity identifier at the device management system. In another example, the encrypted identifier is encrypting using a shared secret between the service node and device management system. Encrypting the identifier using the service node public key and/or shared secret ensures that only the service node and possibly the device management server can access the cryptographically-obscured identifier. The end entity and/or user thereof may not be able to decipher and/or otherwise access the encrypted identifier.

In some embodiments, a cryptographically-obscured identifier includes a hash of an identifier associated with the end entity. The hash of the identifier may be generated and stored at the device management system. In some cases, the device management system includes a database of end identity hash values. The database may include identifiers for multiple end entities. The multiple end entities may include various devices, instances of applications installed on the devices, and/or other entities. In some cases, the database includes hashes of identifiers for each of multiple end entities. In some embodiments, the end entity identifier is hashed using a particular hash function and/or mechanism. The hash function and/or mechanism may be stored at the device management system and/or service node so reference identifiers may be hashed using the same hash function (as discussed below). In some embodiments, the hash function and associated keys and parameters may be provided to the service node for use in identifier validation.

At 330, a certificate including the cryptographically-obscured identifier(s) is generated. The certificate may be generated based on negotiations with certificate/registration authority separate from the device management server and/or a certificate authority associated with the device management server.

In various embodiments, a certificate authority and/or registration authority is separate from (external to) the device management system. In this case, a certificate request is sent to the certificate authority and/or registration authority. In some embodiments, the certificate request includes the public key of the end entity, a distinguished name associated with the end entity, a subject alternative name associated with end entity (e.g., including cryptographically-obscured identifiers), a set of attributes providing other information about the entity, and/or other information. In various embodiments, a certificate (e.g., X.509 certificate) is received from the certificate authority and/or registration authority. The certificate may include cryptographically-obscured identifier(s), cryptographically-obscured user/device/application-identifiable information, and/or other information commonly included in an identity certificate.

According to some embodiments, the certificate request sent to an external certificate authority and/or registration authority includes the end entity identifier, user identifiable information, device identifiable information, and/or other certificate request information in non-obscured form (e.g., in plaintext, cleartext, etc.). In this case, the end entity identifier, user identifiable information, device identifiable information, and/or other information in the certificate are cryptographically-obscured when the certificate is received from the certificate authority and/or registration authority. For example, the certificate is processed at the device management platform to cryptographically-obscure the end entity identifier, user identifiable information, device identifiable information, and/or other information included in the certificate.

According to some embodiments, the certificate authority is included in the device management system, and a certificate is generated at the internal (onboard) certificate authority. In one example, a user interface is provided at the device management server, and an administrator may input information in the interface for inclusion in the certificate. The device management system and/or certificate authority cryptographically-obscures (e.g., encrypts, hashes, obscures, etc.) the end entity identifier, user identifiable information, device identifiable information, and/or other information entered into the interface. A certificate is generated based on the information provided in the interface. In various embodiments, a certificate is automatically generated at a certificate authority associated with the device management server.

At 340, the certificate is provided to the end entity. In various embodiments, the device management server and/or certificate authority provides the certificate to the end entity. The certificate may be provided to an end entity, such as a mobile device, application on a mobile device, a laptop, desktop, and/or other computing device. In various embodiments, the certificate is provided to a management agent installed on a mobile device. In this case, the management agent may provide the certificate to an application associated with the certificate, store the certificate, and/or perform other operations.

Figure 4:
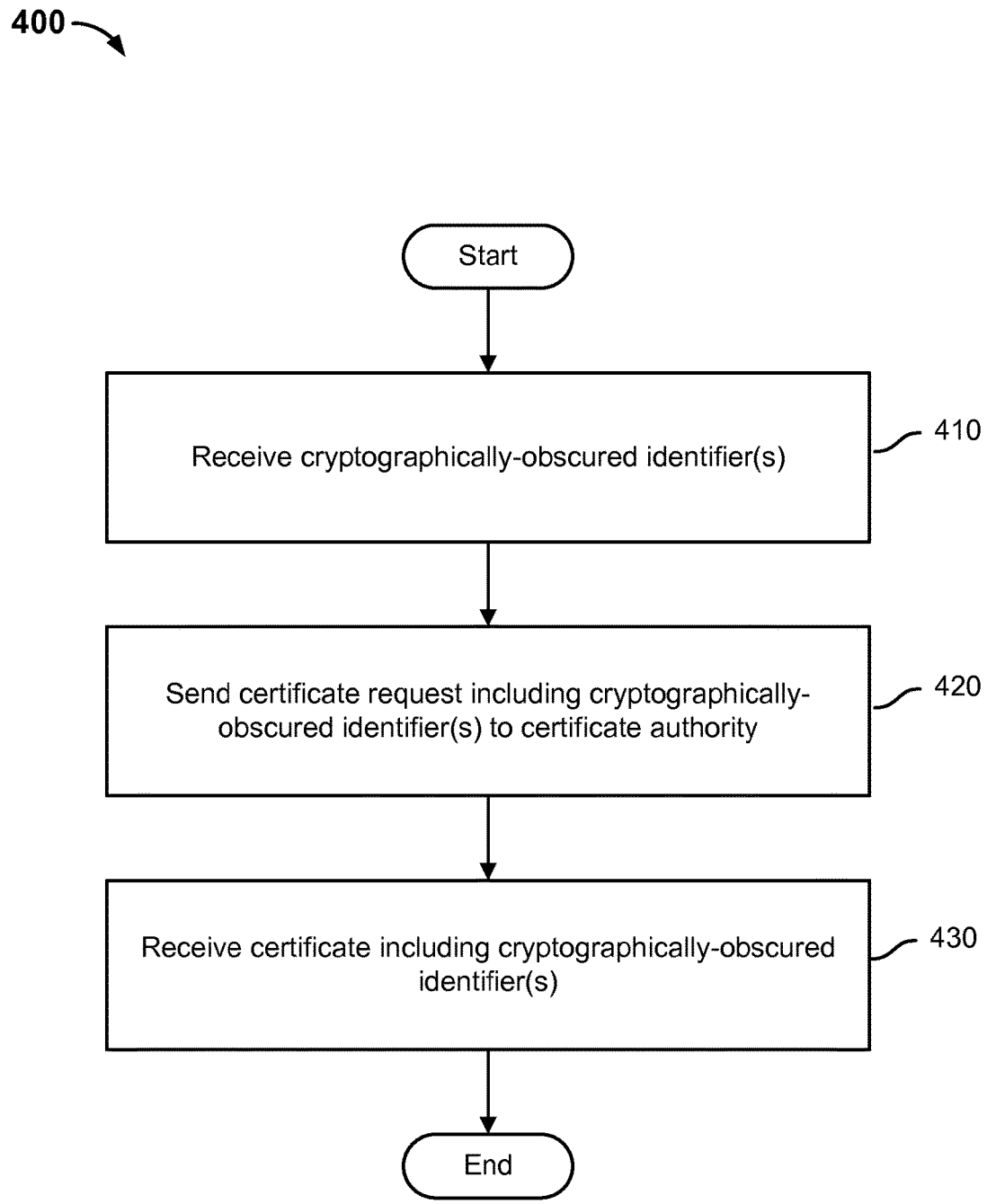
FIG. 4 is a flow chart illustrating embodiments of a process of generating a certificate at an end entity.

FIG. 4 is a flow chart illustrating embodiments of a process of generating a certificate at an end entity. In various embodiments, the process 400 is performed at device end entity 110 of FIG. 1B. At 410, cryptographically-obscured identifier(s) are received. In various embodiments, cryptographically-obscured identifier(s) are received from a device management server at an end entity, such as a mobile device.

In some embodiments, a device management server initiates certificate enrollment. The device management server may encrypt (e.g., using the service node public key, a shared secret, etc.), hash, and/or otherwise cryptographically obscure an identifier associated with the end entity. The device management server may push the enrollment command(s), the cryptographically-obscured identifier(s), and/or other information to the end entity. This information may be pushed to an enrollment agent and/or engine associated with the end entity.

In various embodiments, step 410 is not performed (optional). In certain cases, a cryptographically-obscured identifier is generated at a certificate authority, and the cryptographically-obscured identifier is added to the certificate by the certificate authority. In some cases, the certificate authority may communicate with a device management platform to determine a cryptographically-obscured identifier for inclusion in a certificate.

At 420, a certificate request including the cryptographically-obscured identifier is sent to a certificate authority and/or registration authority. In various embodiments, an end entity negotiates with a certificate authority and/or registration authority to obtain a certificate. In some cases, the end entity may include and/or be associated with a certificate enrollment client (enrollment engine) that is configured to obtain certificates for the end entity. And the enrollment engine sends the certificate request including the cryptographically-obscured identifier to a certificate authority.

In various embodiments, the certificate authority and/or registration authority generates a certificate based on the certificate request. The certificate is sent to the end entity, device management system, and/or other nodes. In various embodiments, the certificate includes cryptographically-obscured end entity identifier(s), device identifiable information, and/or application identifiable information.

In some embodiments, the certificate authority and/or registration authority generates a cryptographically-obscured identifier(s) and includes the cryptographically-obscured identifier(s) in a certificate. In various embodiments, the certificate authority and/or registration authority communicates with a device management system to determine a cryptographically-obscured identifier for inclusion in the certificate. The certificate authority and/or registration authority may receive the cryptographically-obscured identifier from the device management system. And the cryptographically-obscured identifier received from the device management server is injected into the certificate.

At 430, the certificate including cryptographically-obscured identifier(s) is received. In various embodiments, the certificate is received at the end entity, an enrollment agent associated with the end entity, a management agent on a device including the entity, and/or other node. For example, the certificate may be provided to an end entity including, for example, a mobile device, application on a mobile device, and/or other node. The certificate and cryptographically-obscured information in the certificate are used to validate the end entity with a service node and/or services associated therewith.

Figure 5:
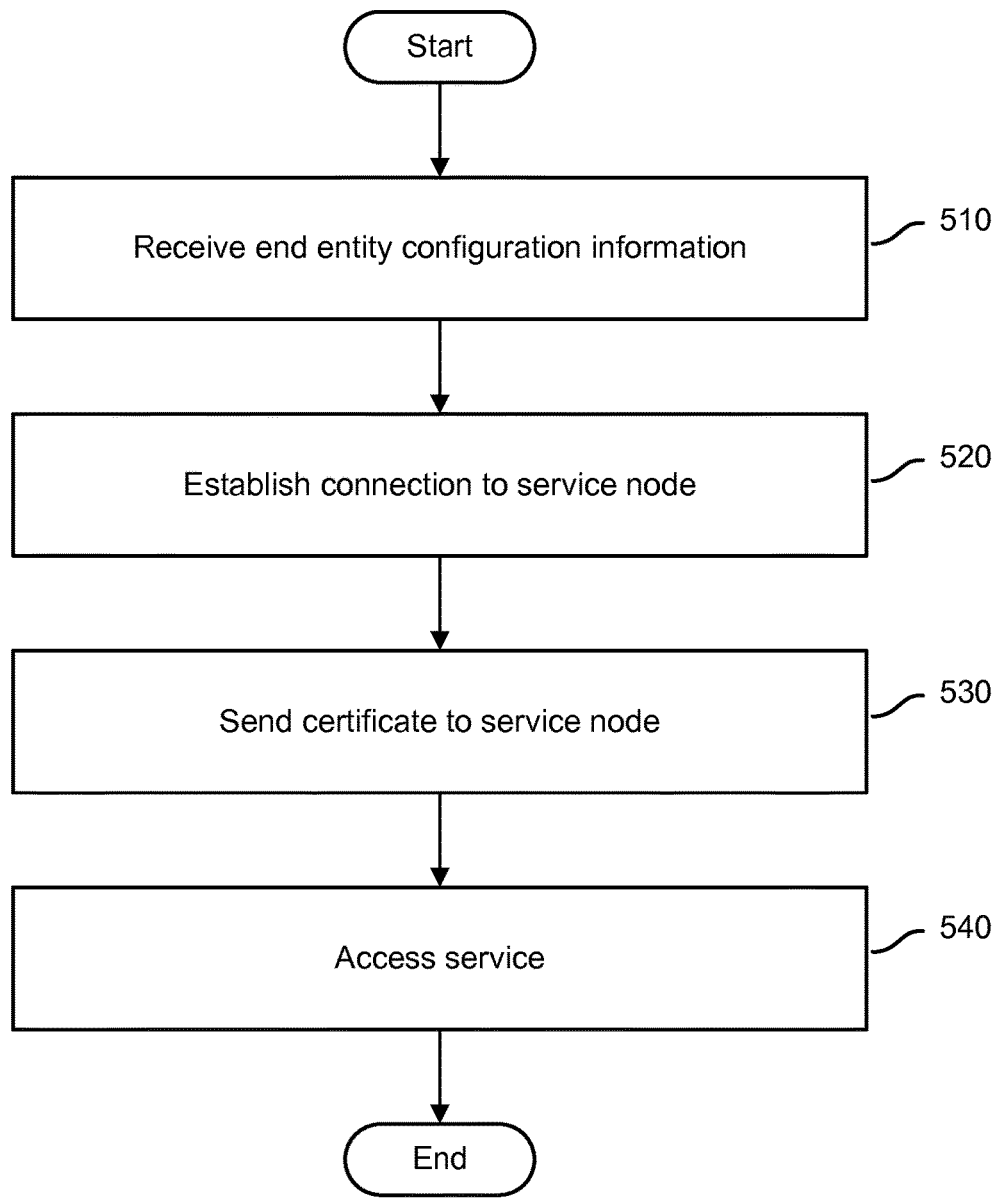
FIG. 5 is a flow chart illustrating embodiments of a process to access a service.

FIG. 5 is a flow chart illustrating embodiments of a process to access a service. In various embodiments, the process 500 may be performed at end entity 110 of FIG. 1A and/or FIG. 1B. At 510, end entity configuration information is received. End entity configuration information is received at an end entity, such as a mobile device, application on a mobile device, management agent on a mobile device, and/or other node. In various embodiments, the end entity configuration information is generated at the device management system. For example, the configuration information may be provided to an application on a mobile device via operating system configuration profile message (e.g., iOS configuration message). The end entity configuration information may include, for example, an application identifier (e.g., application UUID, etc.), a device identifier (e.g., device MAC address, device IMEI, Microsoft AciveSync server device identification parameter, etc.), and/or other configuration information. The configuration information includes information used to establish a connection with the service node and/or backend services. The configuration information may include parameters used in a protocol for establishing a connection between the end entity and the service node and/or backend services.

In various embodiments, step 510 may be optional depending on a type of second factor verification technique is used.

At 520, a connection is established to the service node. In various embodiments, a secure connection is established between the end entity and the service node. An end entity may establish a connection with a service node using a communications protocol such as SSL, TLS, and/or other suitable communication protocol. In certain cases, the protocol used to connect the end entity to the service node may specify that device identification information, application identification information, user identification information, and/or other information be included in the data transferred from the end entity to the service node. For example, data/messages transferred according to certain protocols may include headers that include device, application, and/or user identification. The device, application, and/or user identification included in the protocol messages may be used, at the service node, device management server, and/or other node, as a reference identifier. As discussed below, the reference identifier is compared to an identifier included in a certificate to validate the identity of an end entity.

At 530, the certificate is sent to the service node. In various embodiments, the certificate is sent from the end entity to the service node to validate the end entity for access to a service associated with the service node. The service node may include a gateway, reverse proxy, proxy, and/or other node between the entity and the service. The certificate and cryptographically-obscured identifier(s) included in the certificate are used at the service node to validate the identity of the end entity.

At 540, the end entity is provided access to the service. In various embodiments, the service node validates the certificate and the cryptographically-obscured identifier(s) included in the certificate. For example, the certificate may be validated at the certificate authority and/or registration authority that issued the certificate. The cryptographically-obscured identifier(s) may be validated by extracting the identifier(s) from the certificate, and comparing the identifier(s) to a reference identifier(s) received at the service node from a source other than the certificate. In the event both validations are successful, the end entity is provided access to the service. In the event that validations are not successful, the end entity is denied access to the services.

Figure 6:
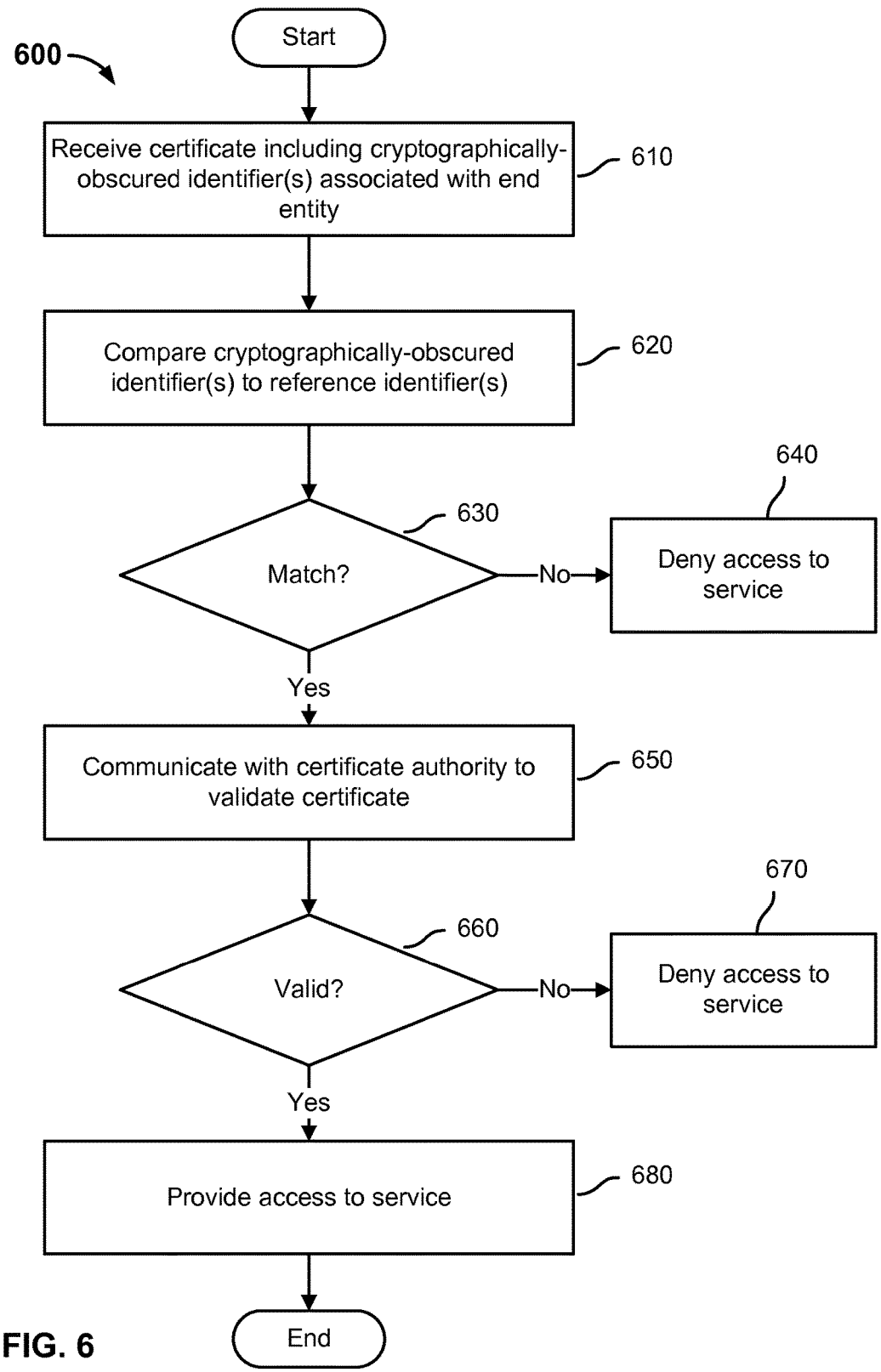
FIG. 6 is a flow chart illustrating embodiments of a process to validate an end entity.

FIG. 6 is a flow chart illustrating embodiments of a process to validate an end entity. In various embodiments, the process 600 is performed at service node 130 of FIG. 1A and/or FIG. 1B. At 610, a certificate including a cryptographically-obscured end entity identifier is received at, for example, a service node. In one example, the certificate is received at the service node as part of a process to validate the identity of the end entity for access to a service. The certificate may be received at the service node in response to a certificate challenge sent from the service node to the end identifier.

At 620, the cryptographically-obscured identifier(s) in the certificate are compared to reference identifier(s). In various embodiments, the cryptographically-obscured identifier(s) are extracted from the certificate and the extracted identifier(s) are compared to reference identifier(s) from a source other than the certificate. In one example, a cryptographically-obscured end entity identifier is extracted from a subject alternative name field included in the certificate. The reference identifier may include any trusted identifier associated with a same end entity that provided the certificate. In some cases, the reference identifier is received from a source other than the certificate. The source of the reference identifier may include, for example, the device management system, a database of end entity identifiers at the device management system, a management agent on the mobile device, communication protocol-based messages from the end entity, and/or any other trusted source that is separate from the certificate.

At 630, it is determined whether the identifier(s) included in the certificate match the reference identifier(s). In the event that the identifier(s) included in the certificate do not match reference identifier(s), the process proceeds to step 640. In the event that the identifier(s) included in the certificate match reference identifier(s), the process proceeds to step 650.

At 640, access to the service is denied. In various embodiments, the service node may deny access to a service associated with the service node. In certain cases, the device management system, end entity, and/or other entities may also be notified the failed validation attempt.

At 650, the service node, device management system, and/or other node communicates with a certificate authority and/or registration authority to validate the certificate. In one example, the service node, management system, and/or other node validates the certificate by accessing a certificate revocation list (CRL) associated with the certificate authority and/or registration authority. In a further example, the certificate authority is associated with the device management platform, and the certificate may be validated at the device management platform.

At 660, it is determined whether the certificate is valid. In various embodiments, the validity of the certificate is evaluated based on the communications with the certificate authority and/or registration authority. In one example, if the certificate is included on a CRL associated with the certificate authority, the certificate may be determined to be invalid (revoked). In the event that the certificate is determined to be not valid, the process may proceed to step 670. In the event that the certificate is determined to be valid, the process may proceed to step 680.

At 670, access to the service is denied.

At 680, the service node provides the end entity access to the service. In various embodiments, the service node may act as a proxy for communications between the end entity and the service.

Figure 7:
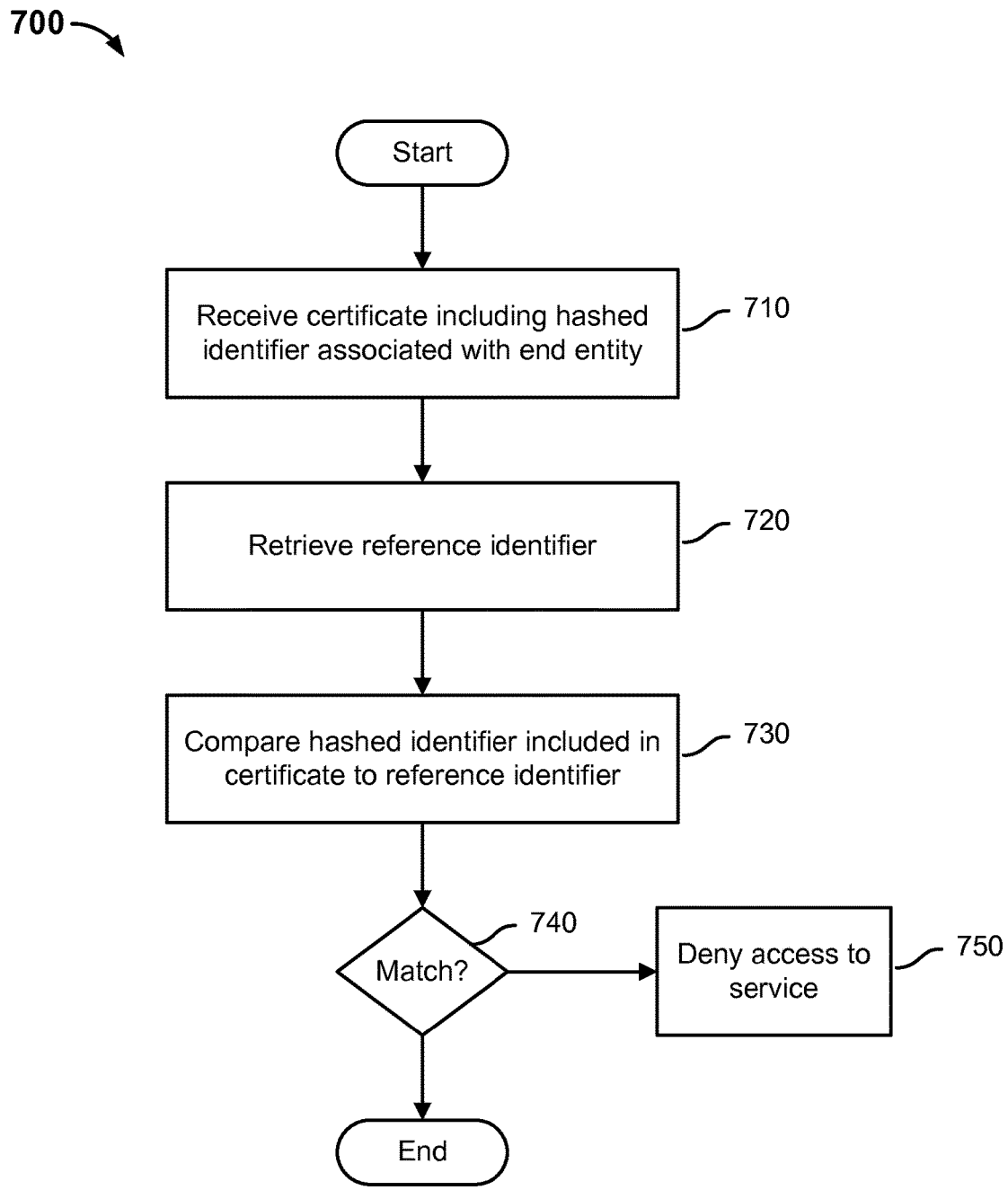
FIG. 7 is a flow chart illustrating embodiments of a process to validate an identifier associated with an end entity.

FIG. 7 is a flow chart illustrating embodiments of a process to validate an identifier associated with an end entity. In various embodiments, the process 700 is performed at service node 130 of FIG. 1A and/or FIG. 1B. At 710, a certificate including a hashed end entity identifier is received at a service node. The hashed end entity identifier may include a device identifier (e.g., MAC address, IMEI, etc.), application identifier (e.g., application UUID), user identifier, and/or other identifier. In various embodiments, the end entity identifier is hashed at the device management platform and added to the certificate during certificate enrollment at the device management platform and/or the end entity. The identifier may be hashed using a hash function and/or other mechanism stored at the device management platform. In certain cases, the hash function and/or other mechanism may be provided to the service node.

At 720, a reference identifier is retrieved from the device management platform and/or other node. In various embodiments, a reference identifier includes a hashed end identifier stored at a device management platform and/or other node. In one example, a device management system includes a database of end entity identifiers (e.g., hashed end entity identifiers). A hashed end entity identifier may be stored in the database when the device management system enrolls the end entity with a certificate authority. For example, the hashed end entity identifier may include the same hashed end entity identifier included in the certificate request sent to the certificate authority. The service node may retrieve the reference hashed identifier by providing the device management system a serial number of the certificate and/or other certificate-identifying information. And the device management system may retrieve the reference hashed identifier for the certificate based on the serial number and/or other certificate-identifying information.

In various embodiments, this step is not performed. In various embodiments, the service node generates a hash of a reference identifier received from a source other than the certificate. The hashed reference identifier may be generated using the same hash function and/or mechanism used to generate the hashed end entity identifier included in the certificate. In one example, a reference identifier is provided to the service node via secure protocol-based connections between the end entity and the service node. The identifier may be included in the header of message(s) sent from the end entity to the service node. In this case, the identifier from the communication header may be hashed and used as a reference identifier.

In some embodiments, the hashed identifier is extracted from the certificate is provided to the device management system. And the extracted hashed identifier is compared to a reference identifier at the device management system.

At 730, the hashed identifier included in the certificate is compared to the hashed reference identifier. In some embodiments, the reference hashed identifier includes the hashed identifier retrieved from the device management platform. As discussed above, this retrieved hashed end entity identifier may include the same (or a copy of the) hashed end entity identifier included added to the certificate by the device management system.

In various embodiments, the reference identifier includes an identifier provided to the service node in messages (e.g., message headers) from the end entity as required by a secure communication protocol. In certain cases, the identifier included in communication protocol-related messages may be a device identifier, application identifier, and/or other identifier received from the device management system. This reference identifier is hashed using the same hash function and/or hash mechanism used to hash the identifier included in the certificate. And the reference hashed identifier and the identifier from the certificate are compared. In either case, the reference hashed identifier should match the hashed identifier in the certificate unless the hashed identifier in the certificate has been altered.

At 740, it is determined whether the reference hashed identifier and the hashed identifier from the certificate match. If, for example, the hashed identifier in the certificate does not match the reference hashed identifier, it may indicate the certificate has been tampered with, transferred to another device, and/or maliciously altered. In the event the reference hashed identifier does not match the identifier from the certificate, the process may proceed to step 750. In the event the reference hashed identifier matches the identifier from the certificate, the validation/authentication process may continue. In some cases, the validation process continues, and a certificate validation is performed as discussed above. In certain cases, the certificate may have been previously validated, and access may be provided to the service.

At 750, access to the service is denied.

Figure 8:
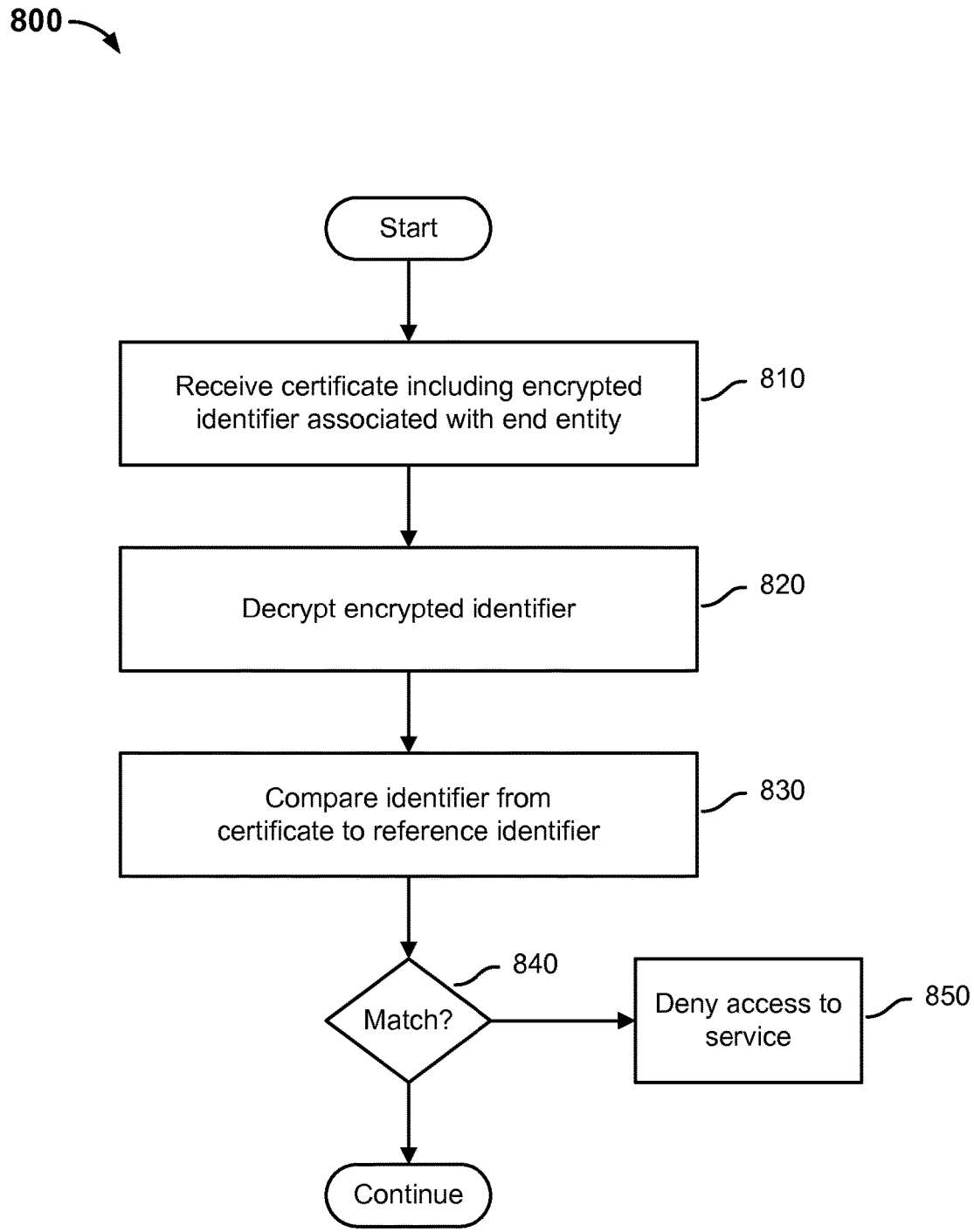
FIG. 8 is a flow chart illustrating embodiments of a process to validate an identifier associated with an end entity.

FIG. 8 is a flow chart illustrating embodiments of a process to validate an identifier associated with an end entity. In various embodiments, the process 800 is performed at service node 130 of FIG. 1A and/or FIG. 1B. At 810, a certificate including an encrypted end entity identifier is received at a service node. In various embodiments, the identifier associated with the end entity is encrypted at the device management system using a public key associated with the service node. In some embodiments, the identifier is encrypted using a shared secret between the entity encrypting the identifier (e.g., a device management system) and the service node.

At 820, the encrypted identifier is decrypted. In various embodiments, the encrypted identifier is decrypted using a private key associated with the service node. In one example, the encrypted identifier is extracted from a field of the certificate, such as the subject alternative name field. In some cases, the identifier was encrypted at the device management platform using a public key associated with the service node. And once extracted, the encrypted identifier is decrypted using the service node private key, a shared secret between the service node and device management system, and/or other decryption mechanism.

At 830, the identifier from the certificate is compared to a reference identifier. As discussed above, a reference identifier may include an identifier retrieved from a device management platform and/or other node, an identifier received at the service node in protocol-related communication, and/or any other reference identifier that is associated with the end entity and received from a source other than the certificate.

At 840, it is determined whether the reference identifier and the identifier from the certificate match. In the event the reference identifier does not match the identifier from the certificate, the process may proceed to step 850. In the event the reference identifier matches the identifier from the certificate, the validation process may continue. In some cases, the validation/authentication process continues, and a certificate validation is performed as discussed above. In certain cases, the certificate may have been previously validated, and access may be provided to the service.

At 850, access to the service is denied.

FIG. 9 is a diagram illustrating embodiments of an interface to generate a certificate. In the example shown, an interface 900 is provided at the device management system, end entity, and/or other node. In various embodiments, a user (administrator) enters information into the interface 900 to generate a certificate for an end entity. For example, a user may set a name (XYZCo-ALL-SCEP-Exchange), description ("Certificates for authentication of Service_X"), whether to enable proxy, whether to cache locally generated keys, a setting type (Local), local certificate authority (XYCo-ALL-Corp-Exchange), a subject (Syc1id:hmacsha1 (svc1key,$USER_EMAIL$), O=Company123), a subject common name type (None), a subject alternative name type (RFC 822 Name), a subject alternative name value (syc1id:hmacsha1(syc1key, "$USER_UPNS$:$DEVICE_SERIAL_NUMBERS$"), a key size (2048 bits), key usage (signing and/or encryption), and/or other certificate parameters. In various embodiments, the interface 900 may be used to generate a certificate including encrypted, hashed, and/or otherwise cryptographically-obscured information.

For example, the subject field of a certificate generated using the interface 900 may include cryptographically-obscured common name (CN) information CN=84828291:A01XF010101. The subject field may also include organization information O=XYZCoExchange in plaintext. The common name (CN) includes a service identifier associated with a mail server (e.g., Exchange server)—84828291. The common name also includes a cryptographically-obscured value (A01XF010101) generated using, for example, a keyed hash algorithm (e.g., HMAC-SHA1). The keyed hash algorithm may receive as inputs/arguments a secure key (0F84828291) associated with the service identifier for the mail server (84828291), a user email address ("$USER_EMAIL$"), and/or other information. This instance of the keyed hash algorithm (hmac-sha1 (0F84828291, "$USER_EMAIL$")) may generate cryptographically-obscured value (A01XF010101) representing the user's email address (e.g., user123@XYZCo.com).

The subject alternative name field of a certificate generated using the interface 900 may include a cryptographically-obscured identifier. For example, the subject alternative name field of the certificate includes user name information (RFC822=84828291:A01XF011234). The subject alternative name (RFC RFC822) includes the service identifier associated with a mail server (e.g., Exchange server)—84828291, and a cryptographically-obscured value (A01XF011234) generated using, for example, a keyed hash algorithm (e.g., HMAC-SHA1). The keyed hash algorithm may receive as inputs/arguments a secure key (0F84828291) associated with the service identifier for the mail server (84828291), a user universal principal name ("$USER_UPN$), a device serial number ($DEVICE_SERIAL_NUMBER$), and/or other information. This instance of the keyed hash algorithm (hmac-sha1 (0F84828291, "$USER_UPN$:$DEVICE_SERIAL_NUMBER$")) may generate a cryptographically-obscured identifier (A01XF011234). The cryptographically-obscured identifier (A01XF011234) is included in the certificate and may be used to validate the identity of the end entity.

In various embodiments, the certificate including the cryptographically-obscured subject information and subject alternative name information is provided to an end entity. The end entity may use the certificate to authenticate itself with a mail server proxy (e.g., service node). In some cases, the mail server proxy node may communicate with the device management system to validate the cryptographically-obscured identifier. The device management system may, for example, compare the cryptographically-obscured identifier (A01XF011234) extracted from the certificate to a stored cryptographically-obscured identifier for the same end entity. The stored value may have been stored when the certificate was generated using the interface 900. In various embodiments, the mail server proxy uses the keyed hash algorithm (HMAC-SHA1), the secure key (0F84828291) and/or a related key (e.g., a private key corresponding to the secure key), and/or other information to validate the cryptographically-obscured identifier (A01XF011234).

Figure 10:
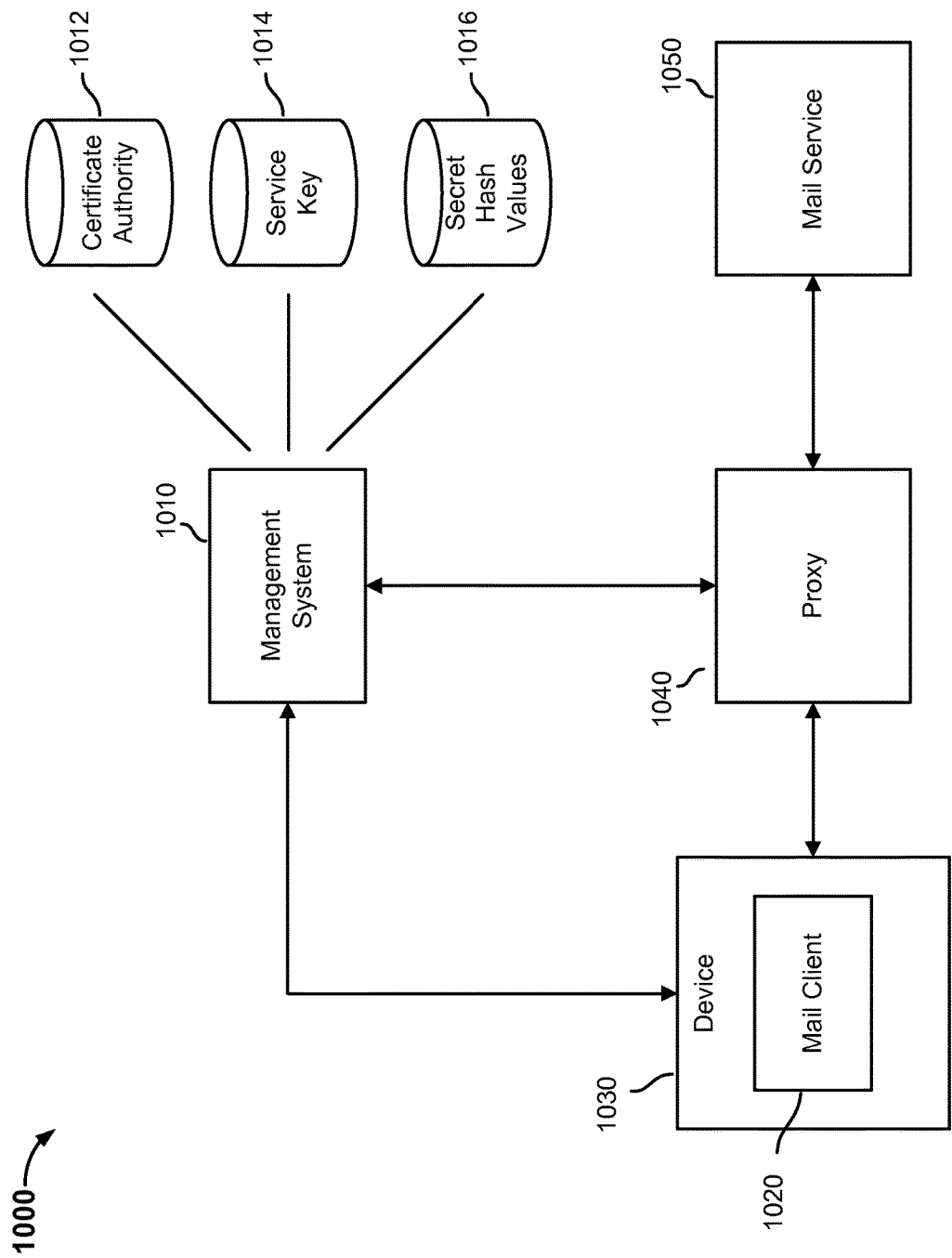
FIG. 10 is a block diagram illustrating embodiments of multiple factor validation with an enterprise mail service.

FIG. 10 is a block diagram illustrating embodiments of second factor validation with an enterprise mail service. In the example shown, a device management system 1010 issues an identity certificate for a mail client 1020 (e.g., Exchange ActiveSync client) installed on a device 1030. In some cases, the certificate may be issued by a device management system 1010 onboard certificate authority. In various cases, the certificate may be issued by a certificate authority or registration authority external to the device management system 1010. The certificate includes the device's 1030 Exchange ActiveSync client ID and/or other identifiers included in, for example, a subject alternative name field of the certificate. The subject alternative name field (including the Exchange ActiveSync client ID and/or other identifiers) a subject field, and/or other information in the certificate may be encrypted using a key associated with a proxy 1040 and/or shared key between the device management system 1010 and proxy 1040. The key and/or shared secret associated with the proxy is stored in a service key database 1014 accessible to the management system 1010. The device management system 1010 may save a hash of the Exchange ActiveSync Client ID in a secret hash value database 1016. The device management system 1010 may also store certificate authority issuance information in a certificate authority database 1012. In some cases, a device management system 1010 may generate and/or update a certificate revocation list (CRL). In some cases, the device management system 1010 provides an Exchange profile with identity certificate to device 1030 and/or mail client 1020.

In various embodiments, the mail client 1020 is configured with a mail configuration profile (e.g., Exchange Profile) received from the management system 1010. The mail client 1020 connects to the proxy 1040 and presents the identity certificate. In a first factor validation step, the proxy 1040 validates the certificate with a CRL, a certificate authority, and/or other node. In a second factor validation step, the proxy 1040 extracts the Exchange ActiveSync Client ID from the configuration profile provided to the mail client 1020 from the device management system 1010. The proxy 1040 validates the cryptographically-obscured Exchange ActiveSync Client ID stored in the certificate's subject alternative name field with the Exchange ActiveSync Client ID from the configuration profile. If the two Exchange ActiveSync Client ID values match, the identity of the mail client 1020 is validated.

In some embodiments, the proxy 1040 communicates with the device management 1010 to validate and/or extract subject or subject alternative name information included in the certificate. For example, the device management system 1010 may have used hash-based protection (e.g., a keyed hash algorithm) to cryptographically obscure the Exchange ActiveSync Client ID included in the certificate. In this case, the proxy 1040 may use a secret key to authenticate itself to device management system 1010 and request an actual value (Exchange ActiveSync Client ID) from the secret hash value database 1016.

In various embodiments, the certificate is validated with the certificate authority and the cryptographically-obscured identifier (Exchange ActiveSync Client ID) in the certificate is validated. In this case, the proxy 1040 retrieves a service token from Active Directory associated with the mail service 105. The token may be retrieved and provisioned to the device 1030 and/or mail client 1020 using, for example, Kerberos Delegation protocol. In some embodiments, the proxy 1040 provides the Kerberos delegation token to an ActiveSync node associated with mail service and access is provided to the mail service 1050 (e.g., Exchange Server).

Figure 11:
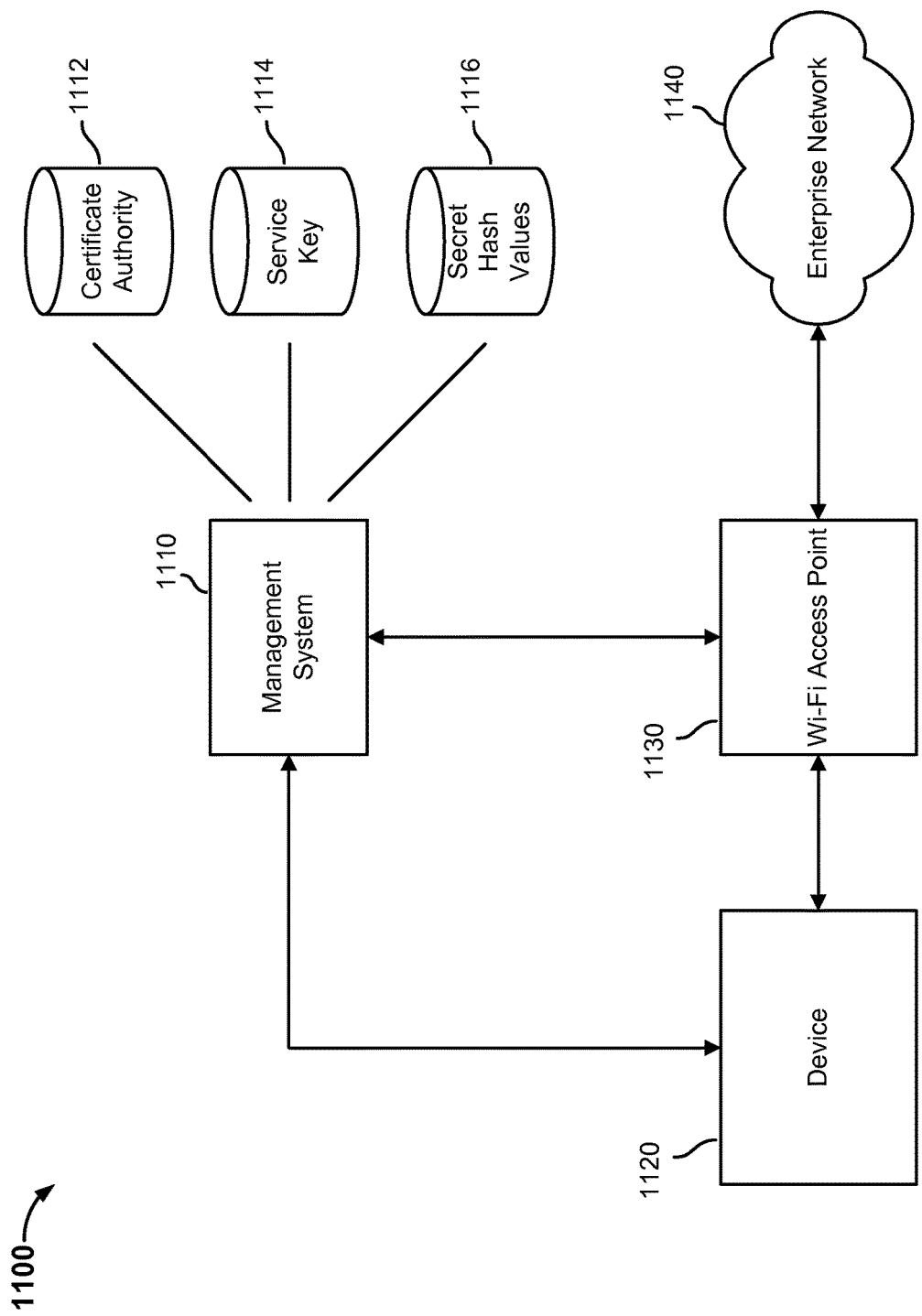
FIG. 11 is a block diagram illustrating embodiments of multiple factor validation with a Wi-Fi access point.

FIG. 11 is a block diagram illustrating embodiments of second factor validation with a Wi-Fi access point. In the example shown, a device management system 1110 issues an identity certificate for a device's 1120 connection engine. The certificate includes the device's 1120 MAC address and/or other identifiers included in, for example, a subject alternative name field of the certificate. The subject alternative name field (including the MAC address and/or other identifiers), a subject field, and/or other information in the certificate may be encrypted using a key associated with a Wi-Fi access point 1130 (Wi-Fi AP) and/or shared key between the device management system 1110 and Wi-Fi AP 1130. The key associated with the proxy is stored in a service key database 1114 accessible to the management system 1110. The device management system 1110 may save a hash of the MAC address in a secret hash value database 1116. The device management system 1110 may also store certificate authority issuance information in a certificate authority database 1112. In some cases, a device management system 1110 may generate and/or update a certificate revocation list (CRL). The device management system 1110 provides a Wi-Fi settings profile and the identity certificate to device 1120.

In various embodiments, the device 1120 Wi-Fi client/engine is configured with the Wi-Fi setting profile received from the management system 1110. The device 1120 Wi-Fi engine connects to the Wi-Fi AP 1130 and presents the identity certificate. In a first factor validation step, the Wi-Fi AP 1130 validates the certificate with a CRL, a certificate authority, and/or other node. In a second factor validation step, the Wi-Fi AP 1130 extracts the MAC address from the Wi-Fi settings profile. The Wi-Fi settings profile is provided to the device 1120 from the device management system 1110 (as discussed above) and used to establish a Wi-Fi connection to the Wi-Fi AP 1130. The Wi-Fi AP 1130 validates the cryptographically-obscured MAC address stored in the certificate's subject alternative name field with the Wi-Fi AP 1130 from the Wi-Fi settings profile. If the two MAC address values match, the identity of the device 1120 is validated.

In some embodiments, the Wi-Fi AP 1130 communicates with the device management system 1110 to validate and/or extract subject or subject alternative name information included in the certificate. For example, the device management system 1110 may have used hash-based protection (e.g., a keyed hash algorithm) to cryptographically obscure the MAC address included in the certificate. In this case, the Wi-Fi AP 1130 may use a secret key to authenticate itself to device management system 1110 and request an actual value (MAC address) from the secret hash value database 1114.

In various embodiments, the certificate is validated with the certificate authority and the cryptographically-obscured identifier (MAC address) in the certificate is validated. In this case, the Wi-Fi AP 1130 provides the device 1120 access to an enterprise network 1140.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:
1. A method, comprising:
sending, from an end entity to a service node, a certificate including a cryptographically-obscured identifier associated with the end entity, wherein the certificate is received by the end entity from a device management server that is separate from the end entity and the service node, wherein the service node uses both the certificate and the cryptographically-obscured identifier to authenticate the end entity at least in part by comparing the cryptographically-obscured identifier to a reference identifier and in response to the cryptographically-obscured identifier matching the reference identifier, the service node is configured to validate the certificate at least in part by communicating with a certificate authority, wherein the certificate authority reviews the validity of the certificate itself, wherein the service node is configured to deny the end entity with access to a service associated with the service node in the event the cryptographically-obscured identifier is validated and the certificate is not validated; and accessing, based at least in part on the authentication and the validation, the service associated with the service node.

2. The method of claim 1, wherein the device management server generates the certificate including the cryptographically-obscured identifier on behalf of the end entity.

3. The method of claim 2, wherein the device management server generates the certificate on behalf of the end entity at least in part by:
generating the cryptographically-obscured identifier;
sending, to a certificate authority, a certificate request including the cryptographically-obscured identifier; and
receiving the certificate including the cryptographically-obscured identifier from the certificate authority.

4. The method of claim 1, further comprising:
receiving the cryptographically-obscured identifier;
sending a certificate request including the cryptographically-obscured identifier to a certificate authority; and
receiving the certificate including the cryptographically-obscured identifier.

5. The method of claim 1, further comprising:
sending a certificate request to a certificate authority; and
receiving the certificate including the cryptographically-obscured identifier, wherein the certificate authority generates the certificate at least in part by injecting the cryptographically-obscured identifier into the certificate.

6. The method of claim 1, wherein the end entity includes one or more of a mobile device and an application included on the mobile device.

7. The method of claim 1, wherein the cryptographically-obscured identifier is generated at a device management server.

8. The method of claim 1, wherein the cryptographically-obscured identifier includes a hash of an identifier associated with the end entity.

9. The method of claim 1, wherein the cryptographically-obscured identifier is generated by encrypting an identifier associated with the end entity using a public key associated with the service node.

10. The method of claim 1, wherein the cryptographically-obscured identifier is generated by encrypting an identifier associated with the end entity using a shared secret associated with the service node and a device management server.

11. The method of claim 1, wherein the cryptographically-obscured identifier includes one or more of a media access control (MAC) address, a mobile device serial number, an application universally unique identifier (UUID), a user identifier, and a mobile device international mobile station equipment identity (IMEI).

12. The method of claim 1, wherein the reference identifier includes a device or application identifier included in a protocol-related communication between the end entity and the service node.

13. The method of claim 1, wherein the service node uses both the certificate and the identifier to authenticate the end entity at least in part by:
extracting the cryptographically-obscured identifier from the certificate;
determining that the extracted identifier matches the reference identifier;
validating the certificate with a certificate authority that issued the certificate; and
providing access to the service based at least in part on the determined match and the validated certificate.

14. The method of claim 1, wherein the service node uses both the certificate and the identifier to authenticate the end entity at least in part by:
extracting a hashed identifier from the certificate;
retrieving a hashed reference identifier;
determining that the hashed identifier from the certificate matches the hashed reference identifier;
validating the certificate with a certificate authority that issued the certificate; and
providing access to the service based at least in part on the determined match and the validated certificate.

15. The method of claim 1, wherein the service node uses both the certificate and the identifier to authenticate the end entity at least in part by:
decrypting an encrypted identifier included in the certificate;
determining that the decrypted identifier matches a reference identifier;
validating the certificate with a certificate authority that issued the certificate; and
providing access to the service based at least in part on the determined match and the validated certificate.

16. The method of claim 15, wherein decrypting the encrypted identifier included in the certificate includes decrypting the encrypted identifier using one or more of a private key associated with the service node and a shared secret associated with the service node and a device management server.

17. A system, comprising:
a processor; and
a memory coupled with the processor, wherein the memory is configured to provide the processor with instructions which when executed cause the processor to:
send, from an end entity to a service node, a certificate including a cryptographically-obscured identifier associated with the end entity, wherein the certificate is received by the end entity from a device management server that is separate from the end entity and the service node, wherein the service node uses both the certificate and the cryptographically-obscured identifier to authenticate the end entity at least in part by comparing the cryptographically-obscured identifier to a reference identifier and in response to the cryptographically-obscured identifier matching the reference identifier, the service node is configured to validate the certificate at least in part by communicating with a certificate authority, wherein the certificate authority reviews the validity of the certificate itself, wherein the service node is configured to deny the end entity with access to a service associated with the service node in the event the cryptographically-obscured identifier is validated and the certificate is not validated; and
access, based at least in part on the authentication and the validation, the service associated with the service node.

18. The system recited in claim 17, wherein the service node uses both the certificate and the identifier to authenticate the end entity at least in part by:
extracting the cryptographically-obscured identifier from the certificate;

determining that the extracted identifier matches the reference identifier;

validating the certificate with a certificate authority that issued the certificate; and providing access to the service based at least in part on the determined match and the validated certificate.

19. The system recited in claim 17, wherein the device management server generates the certificate including the cryptographically-obscured identifier on behalf of the end entity.

20. A computer program product, the computer program product being embodied in a tangible non-transitory computer readable storage medium and comprising computer instructions for:

sending, from an end entity to a service node, a certificate including a cryptographically-obscured identifier associated with the end entity, wherein the certificate is received by the end entity from a device management server that is separate from the end entity and the service node, wherein the service node uses both the certificate and the cryptographically-obscured identifier to authenticate the end entity at least in part by comparing the cryptographically-obscured identifier to a reference identifier and in response to the cryptographically-obscured identifier matching the reference identifier, the service node is configured to validate the certificate at least in part by communicating with a certificate authority, wherein the certificate authority reviews the validity of the certificate itself, wherein the service node is configured to deny the end entity with access to a service associated with the service node in the event the cryptographically-obscured identifier is validated and the certificate is not validated; and accessing, based at least in part on the authentication and the validation, the service associated with the service node.

21. The computer program product recited in claim 20, wherein the device management server generates the certificate including the cryptographically-obscured identifier on behalf of the end entity.

* * * * *